United States Patent [19]

Teraguchi et al.

[11] Patent Number: 4,574,322

[45] Date of Patent: Mar. 4, 1986

[54] CHANNEL CHANGING MECHANISM OF A TAPE PLAYER

[75] Inventors: Yuji Teraguchi; Sadayoshi Endo, both of Tokyo, Japan

[73] Assignee: Clarion Co., Ltd., Tokyo, Japan

[21] Appl. No.: 578,948

[22] Filed: Feb. 10, 1984

[30] Foreign Application Priority Data

Feb. 15, 1983 [JP] Japan .................................. 58-22043

[51] Int. Cl.[4] ........................ G11B 15/44; G11B 21/08
[52] U.S. Cl. ..................................... 360/74.1; 360/78; 360/106
[58] Field of Search .......................... 360/74.1, 78, 106

[56] References Cited

U.S. PATENT DOCUMENTS

| | | | |
|---|---|---|---|
| 4,227,223 | 10/1980 | Magata et al. | 360/73 |
| 4,419,702 | 12/1983 | Tanaka | 360/96.4 |
| 4,452,409 | 6/1984 | Takai | 242/204 |

Primary Examiner—George G. Stellar
Attorney, Agent, or Firm—Flynn, Thiel, Boutell & Tanis

[57] ABSTRACT

A tape player includes a fast-forwarding and rewinding mechanism consisting of forward-drive means for setting the tape player in the fast-forwarding mode, reverse-drive means for setting the tape in the rewinding mode and forward-drive and reverse-drive electromagnetic plungers associated with the forward- and reverse-drive means. A channel changing mechanism according to the invention comprises: an off plate reciprocal between its stop mode and play mode positions responsively to a head shift mechanism and responsively to one of the electromagnetic plungers; a drive gear continuously rotated by a drive motor; a change gear including a tooth train engageable with the drive gear and a cut-off partly breaking the tooth train for interruption of engagement with the drive gear; a change link plate reciprocal responsively to rotation of the change gear for switching a pinch roller and an idler gear between the forward-drive and reverse-drive modes; and a change-off plate resposive to the off plate in the play mode for locking the change gear at a position not engageable with the drive gear.

7 Claims, 10 Drawing Figures

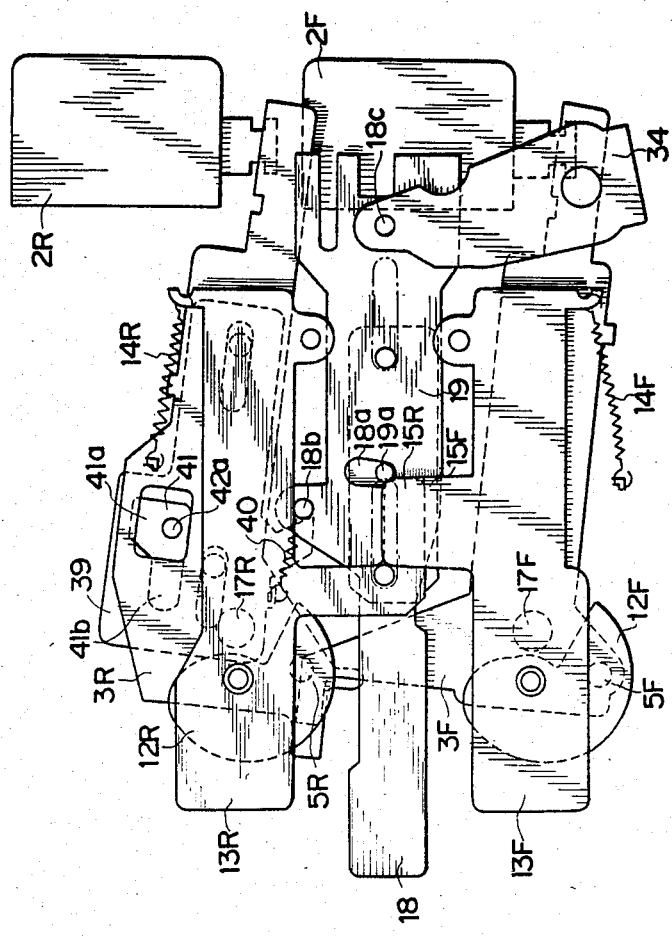

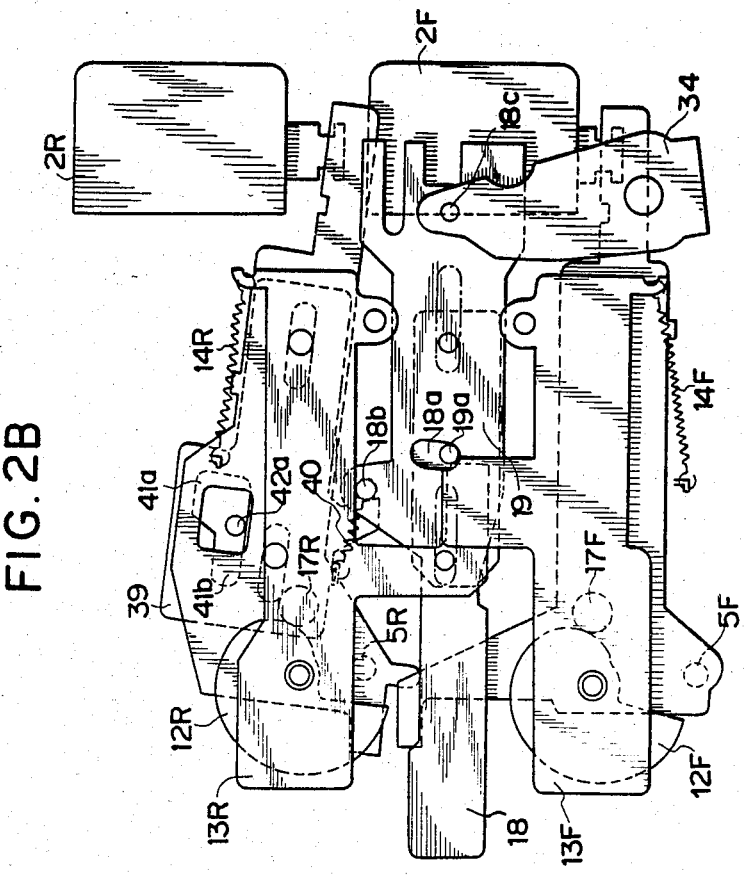

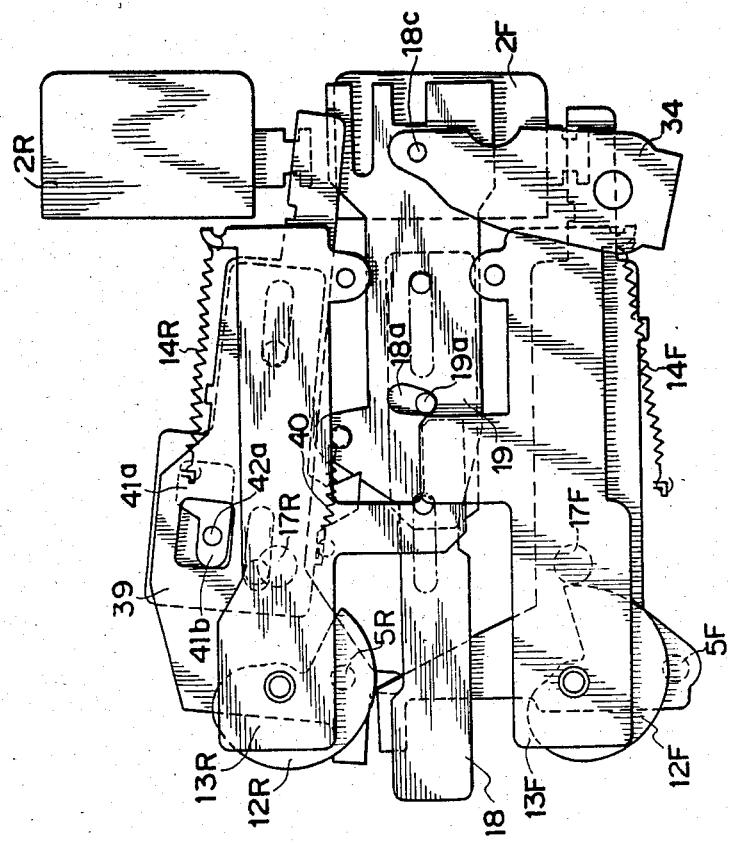

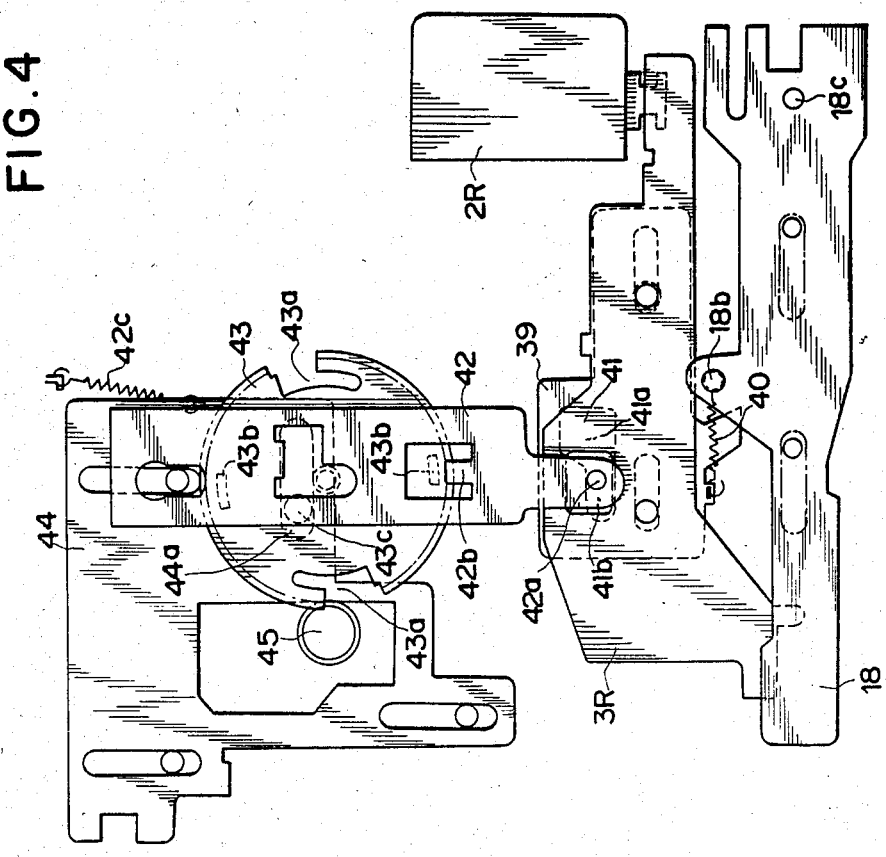

CHANNEL CHANGING MECHANISM OF A TAPE PLAYER

FIELD OF THE INVENTION

This invention relates to a channel changing mechanism of a tape player, and more paticularly to such a mechanism capable of effecting a channel changing operation by commonly using plungers and cam gears which are provided for effecting reproduction, fast-forwarding and rewinding of a tape.

BACKGROUND OF THE INVENTION

It is known to use a motor in a tape player for automatically actuating some mechanisms such as (1) a head shift mechanism which moves a head to and away from a tape loaded in the tape player, (2) a fast-forwarding and rewinding mechanism which commutes an idler gear between its forward-drive and reverse-drive modes, and (3) a channel changing mechanism which effects reversion of tape travelling directions to continue reproduction or recording of a tape as it is, without drawing out the tape cassette to revert it when the tape reaches the end. To transmit the motor power to these mechanisms, it is usual to use a transmission means which includes a cam gear unlocked at the beginning of actuation of the respective mechanisms and disposed for rotation with the motor power, so that the rotation of the cam gear is converted to a linear movement of a power plate to actuate said mechanisms.

In such a tape player, the fast-forwarding and rewinding mechanism, for example, includes two electromagnetic plungers and two cam gears to provide independent driving means for the forward-drive (fast-forwarding) mode and the reverse-drive (rewinding) mode, respectively, and operates as follows:

To effect a fast-forwarding operation, the plunger of the forward-drive mode is merely energized to let the associated cam gear rotate and to displace the power plate forward. The driving means for the reverse-drive mode is kept undriven at this moment. An idler gear is displaced to the forward-drive reel base accordingly and effects a fast-forwarding tape travel. Instead, to effect a rewinding operation, the driving means for the reverse-drive mode is merely actuated to displace the idler gear to the reverse-drive reel base.

To change the tape player from the stop mode to a play mode, the both plungers are concurrently energized to actuate the both driving means to displace a head to the tape.

Provision of two independent driving means to effect fast-forwarding, rewinding and play operations allows omission of a mechanism exclusively used for tape reproduction, and leads to a simpler and easier construction and operation of the tape player.

To effect a channel changing operation in such a tape player, the prior art employs another plunger and another cam gear exclusive for channel changing operation in addition to those for the fast-forwarding and rewinding modes, so that the exclusive cam gear rotates when a channel changing switch is pushed, and transmits the motor power to the channel changing mechanism.

DRAWBACKS OF THE PRIOR ART

In such a prior art tape player employing said independent plungers, the plungers represent various on-off aspects. For example, the forward-drive and reverse-drive plungers are kept energized to hold the head at the play position during a play mode, whereas the channel changing plunger is deenergized during this time so as never to effect the channel changing operation. To have a channel changing operation effected, the channel changing plunger is energized. At that time, the forward-drive and reverse-drive plungers also must be kept energized since such channel changing operations are merely effected during play modes. In the fast-forwarding mode, only the forward-drive plunger is energized and the other two plungers are deenergized, whereas, in the rewinding mode, only the reverse-drive plunger is energized and the other two plungers are deenergized.

Said prior art tape player employing three plungers to drive various mechanisms therein by a single drive source (motor) is inevitably complicate and difficult in creating proper on-off aspects of the three plungers according to a selected tape feeding mode. Beside this, the electromagnetic plunger for the channel changing operation must have a considerably large energy and scale to displace the pinch roller and the idler gear.

In view of the fact that the recent market demands both an automation of so many mechanisms as possible in a tape player and a further reduction in overall size and weight of the tape player, said prior art tape player cannot meet this requirement because provision of many exclusive-use plungers to control various mechanisms causes an increase of the overall dimension of the tape player, and makes their control operations be extremely complicate. This also causes an increase of the production cost.

This problem still remains when the tape player includes another driving means exclusive for play mode and another electromagnetic plunger for controlling the play mode driving means, in addition to those for the aforegoing forward-drive and reverse-drive modes.

OBJECT OF THE INVENTION

It is therefore an object of the present invention to meet the market demand, by providing a channel changing mechanism of a tape player which is actuated by plungers used for a fast-forwarding and rewinding mechanisms, thus promoting compactness and conciseness of a tape player.

SUMMARY OF THE INVENTION

The inventor made this invention, taking it into consideration that a channel changing operation can be merely effected in a tape play mode, in a tape player including two independent forward-drive and reverse-drive means. The channel changing mechanism according to the invention includes an off plate reciprocal between its stop mode and play mode positions, so that during a play mode, when one of plungers of the two drive means which is normally deenergized in the play mode is temporarily energized, the off plate which is placed at the play mode position actuates the channel changing mechanism. Thereby, all the fast-forwarding, play and channel changing operations are effected by selective use of only the two electromagnetic plungers.

BRIEF DESCRIPTION OF THE DRAWINGS

FIGS. 1 to 7 are plan views illustrating a channel changing mechanism embodying the invention, in which:

FIGS. 1a and 1b show drive means in the stop mode of the tape player;

FIGS. 2a and 2b show the drive means at the beginning of power transmission;

FIGS. 3a and 3b show the drive means at the play mode;

FIG. 4 shows the channel changing mechanism at the beginning of a channel changing operation;

FIG. 5 shows the channel changing mechanism upon completion of the channel changing operation;

FIG. 6 shows various components associated with a head plate and in the stop mode of the tape player; and FIG. 7 shows the components shown by FIG. 6 in the play mode.

DETAILED DESCRIPTION OF THE PREFERRED EMBODIMENT

Figure 1A:
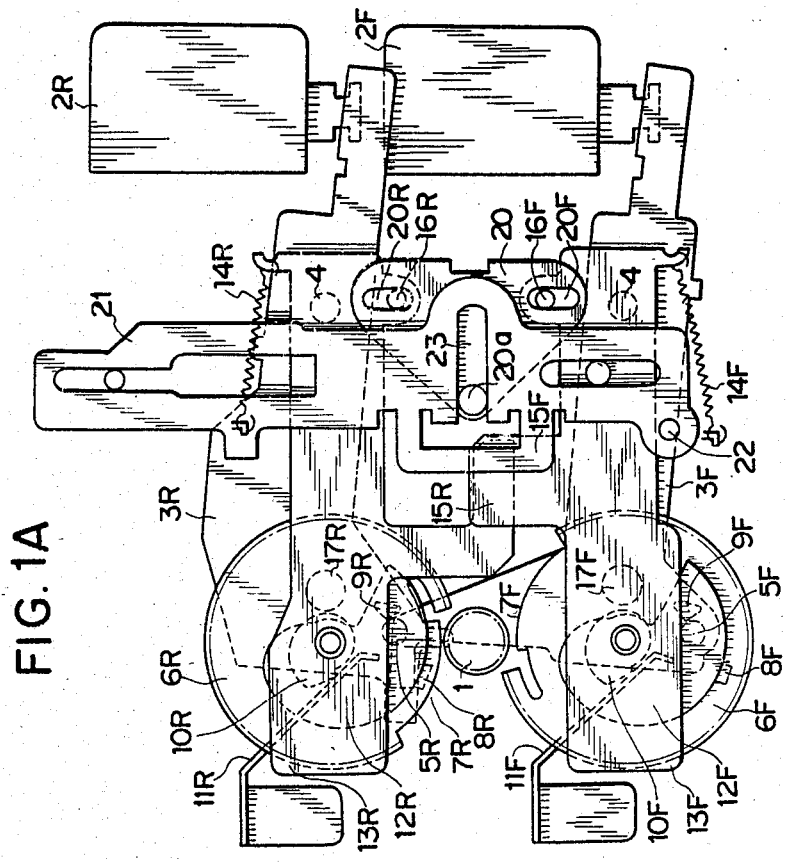

The invention will now be described in detail by way of a preferred embodiment illustrated referring to the drawings.

(1) CONSTRUCTION

Forward-Drive (Fast-Forwarding) Driving Means

The tape player illustrated has two, forward-drive and reverse-drive driving means extending in substantially parallel and horizontal two alleys in the drawings. The driving means respectively have cam gears which will be described later, positioned at both sides of a drive gear 1.

The forward driving means in the lower alley in the Figures includes a lock arm 3F having one end connected to an electromagnetic plunger 2F. The lock arm 3F is pivotal about an axle 4 thereof in the counter-clockwise direction when the plunger 2F is energized and in the clockwise direction when the plunger 2F is deenergized.

The lock arm 3F is a plate-like member extending transversely in the Figures, and is formed with a lock member 5F projecting upward from the surface near the left end thereof. The lock member 5F has a roller-shaped top end engageable with a locked member and an engagement member of a cam gear which will be described later.

The lock arm 3F carries thereon a cam gear 6F beside the drive gear 1. The cam gear includes a cut-off 7F partly breaking the tooth train along the periphery thereof, so that the cam gear 6F rotates with the rotation of the drive gear 1 when the cut-off 7F is away from the drive gear 1 whereas the cam gear 6F does not rotate when the cut-off 7F faces the drive gear 1.

The cam gear 6F has an engagement member 8F projecting from the lower surface thereof, near the tooth train thereof and symmetrically of the cut-off 7F. The cam gear 6F also has a locked member 9F extending from the lower surface thereof, at a position slightly radially inward and slightly clockwisely backward of the engagement member 8F. The engagement member 8F and the locked member 9F have a distance therebetween permitting the lock member 5F to pass through. The lock member 5F engages the locked member 9F when the plunger 2F is deenergized, and engages the engagement member 8F when the plunger 2F is energized.

A spiral cam 10F having two steps along the periphery thereof is concentrically fitted to the lower surface of the cam gear 6F. The cam 10F is always pushed in the clockwise direction by a spring plate 11F fixed to a base plate of the tape player, and is rotated to a position whereat the cam gear 6F meshes the drive gear 1 when the cam gear 6F is unlocked at the beginning of the play mode. The spring plate 11F forcibly contacts the radially inner one of the steps of the cam 10F when the cam gear 6F stops during the stop mode of the tape player, and contacts the radially outer one of the steps when the cam gear 6F stops during the play mode.

A spiral dirve cam 12F is concentrically fitted on the upper surface of the cam gear 6F. A mode plate 13F is mounted above the drive cam 12F reciprocally in the transverse direction in the Figures, and is normally biased away from the plunger 2F by a spring 14F. The mode plate 13F has a rollershaped cam follower 17F projecting from the lower surface thereof toward the cam gear 6F and contacting the periphery of the drive cam 12F. Placement of the cam follower 17F is selected so that the cam follower 17F is located at a position along the periphery of the cam gear 6F whereat the radius is shortest, when the cam gear 6F stops at the position not engageable with the drive gear 1. The mode plate 13F has an urging member 15F bulging out from the center of the lateral edge thereof facing the drive gear 1 to urge a pin of a lock plate which will be described later, when the mode plate 13F advances (to the right in the Figures). The mode plate 13F also has an engagement pin 16F projecting from the same lateral edge thereof at a position nearer to the plunger 2F for engagement with a joint plate which will be described later.

Reverse-Drive (Rewinding) Driving Means

The reverse-drive driving means is parallelly disposed with the forward-drive driving means, and correspondingly includes an electromagnetic plunger 2R, lock arm 3R, lock member 5R, cam gear 6R, cut-off 7R, engagement member 8R, locked member 9R, cam 10R, spring plate 11R, urging member 15R, engagement pin 16R, and cam follower 17R. The cut-off 7R, however, is symmetrical of the cut-off 7F so that it faces the drive gear 1 in the stop mode.

Slide Plate and Joint Plate

A slide plate 18 is reciprocally mounted in parallel with and between the two mode plates 13F and 13R. The slide plate 18 has a hole 18a at a central portion thereof. The hole 18a receives therein a pin 19a formed at the center of a lock plate 19 reciprocally mounted under the slide plate 18. The pin 19a is long enough to reach the mode plates 13F and 13R and contact the urging members 15F and 15R. The slide plate 18 and the lock plate 19 are controlled by means not shown, so as to ensure the parallel movements thereof with the movement lines of the mode plates 13F and 13R.

A joint plate 20 is mounted above and between the mode plates 13F and 13R, with the base plate of the tape player interposed therebetween. The joint plate 20 is substantially an isosceles triangle, and has a guide pin 20a at the vertex thereof and elongated holes 20F and 20R at the other corners. The elongated holes receive therein the engagement pins 16F and 16R of the mode plates 13F and 13R, respectively. The engagement pins 16F and 16R are slidably inserted in and guided by elongated holes not shown formed in the base plate of the tape player so that they can always parallelly move in the transverse direction in the Figures.

Fast-Forwarding and Rewinding Plate

A fast-forwarding and rewinding plate 21 is mounted to substantially overlap with the joint plate 20. The fast-forwarding and rewinding plate 21 is supported by the base plate of the tape player for reciprocal movement to and away from the forward-drive and reverse-drive means. One end of the fast-forwarding and rewinding plate 21 nearer to the forward-drive means has a fast-forwarding and rewinding pin 22 for linkage to a search link which will be described later. The plate 21 also has a guide slot 23 elongated in the movable direction of the joint plate 20 at a location corresponding to the center of the joint plate 20. The guide slot 23 reciprocally receives therein the guide pin 20a of the joint plate 20.

Head Plate Mechanism

A head plate 25 carrying a head 24 is disposed movable in the transverse direction in the Figures, and is normally biased in the withdrawal direction (to the left in the Figure) by a pair of springs 26 and 27. In the play mode, the head plate 25 is driven by the mode plates 13F and 13R against the energy of the springs 26 and 27, to a position whereat the head 24 forcibly contacts a tape T travelling to and from capstan axles 28F and 28R.

An assistant arm 29 is pivotally supported by an axle 30 to a position in the right of the head plate 25. One end of the assistant arm 29 has a pin 31 engaging a head plate arm which will be described later, for effecting advancement of the head plate 25. The assistant arm 29 is also connected to the head plate 25 by a spring 32 normally biasing it in the withdrawal direction. The spring 32 has an energy larger than that of said springs 26 and 27.

A head arm 34 is pivotally supported by an axle 33 to the lower surface of the base plate. The head plate 25 has two arms with different heights. The upper arm has at one end thereof a hole 34a engaging a head plate advancement pin 31 whereas the lower arm engages a pin 18c of the aforedescribed slide plate 18.

A search link 35 is pivotally mounted on the base plate, concentrically with the head plate arm 34. One end of the search link 35 has a step 35a for engagement with an engagement pin 36 projecting from the lower surface of the head plate 25 when the head plate 25 advances. When the step 35a engages the engagement pin 36, a control pin 35b formed on the search link 35 enters in a cavity portion of a control hole 37 formed in the head plate 25 to keep the search link 35 from rotation. When the control pin 35b escapes from the cavity portion of the control hole 37, the search link 35 rotates to an extent whereat the control pin 35b stands beside one of edges 37F at both sides of the cavity portion, and the step 35a for the search link 35 is away from the engagement pin 36 of the head plate 25.

The search link 35 also has a hole 35c between the step 35a and the control pin 35b thereof. The hole 35c receives therein the fast-forwarding and rewinding pin 22 of the fast-forwarding and rewinding plate 21 to effect rotation of the search link 35 in response to reciprocal movement of the fast-forwarding and rewinding pin 22 in an elongated hole 38 formed in the base plate of the tape player.

Off Plate

An off plate 39 is mounted under the lock arm 3R of the reverse-drive means so as to overlap with each other. The off plate 39 is reciprocal concurrently with and also independently from the lock arm 3R. The off plate 39 is connected to a pin 18b of the slide plate 18 by a spring 40 and is biased in the advancement direction of the slide plate 18. The off plate 39 has a change control hole 41 receiving a change pin of a change off plate which will be described later. The change control hole 41 includes a wider half 41a and a narrower half 41b so as to receive the change pin in the wider half 41a when the off plate 39 is at the retracted position and in the narrower half 41b when the off plate 39 is at the advanced position.

Program Changing Mechanism

A program changing mechanism is placed at one side of the reverse-drive means, remoter from the forward-dirve means. The program changing mechanism generally comprises a change-off plate 42, change gear 43 and change link plate 44.

The change-off plate 42 is reciprocally mounted on the base plate of the tape player by means of a change pin 42a inserted in the change control hole 41 and a plate member having a gear lock means 42b to lock the change gear 43. The reciprocal direction of the change plate 42 is perpendicular to the movable direction of the mode plates 13F and 13R and other members of the aforedescribed drive means. The change-off plate 42 is normally biased by a spring 42c in the withdrawal direction (away from the reverse-drive means).

The change gear 43 is fixed to a central position of the lower surface of the change off plate 42. The change gear 43 is an intermittent gear having two symmetrical cut-off 43a partly breaking the peripheral tooth train thereof. When one of the cut-off 43a faces a drive gear 45 continuously rotating with the motor power, the change gear 43 does not rotate. When the both cut-off 43a are away from the drive gear 45, the change gear 43 engages it and is rotated thereby. The change gear 43 has two symmetrical engagement members 43b on one flat surface thereof at positions making a right angle with the respective cut-off 43a. The engagement members 43b are engageable with the gear lock means 42b of the change-off plate 42.

The change link plate 44 is mounted under the change gear 43. The change link plate 44 has an elongated hole 44a receiving therein a pin 43c of the change gear 43 to transmit rotation of the change gear 43 to the change link plate 44. The change link plate 44 is reciprocally supported at one end thereof to the base plate of the tape player so as to reciprocate in the same direction as the change-off plate 42 in accordance with rotation of the change gear 43. The change link plate 44 is linked to pinch rollers via a roller change plate not shown which is located at one side thereof opposed to the head plate 25, and also to a reel base driving idler gear via an idler change plate not shown. Reciprocation of the change link plate 44 causes a forcible contact of one of the pinch rollers with an associated capstan axle, and an engagement of the idler gear with a forward-drive or reverse-drive reel base, thereby effecting a program changing operation.

The change link plate 44 has a plate spring not shown to operate a switch provided for switching output signals of the head.

(2) OPERATION

Figure 6:
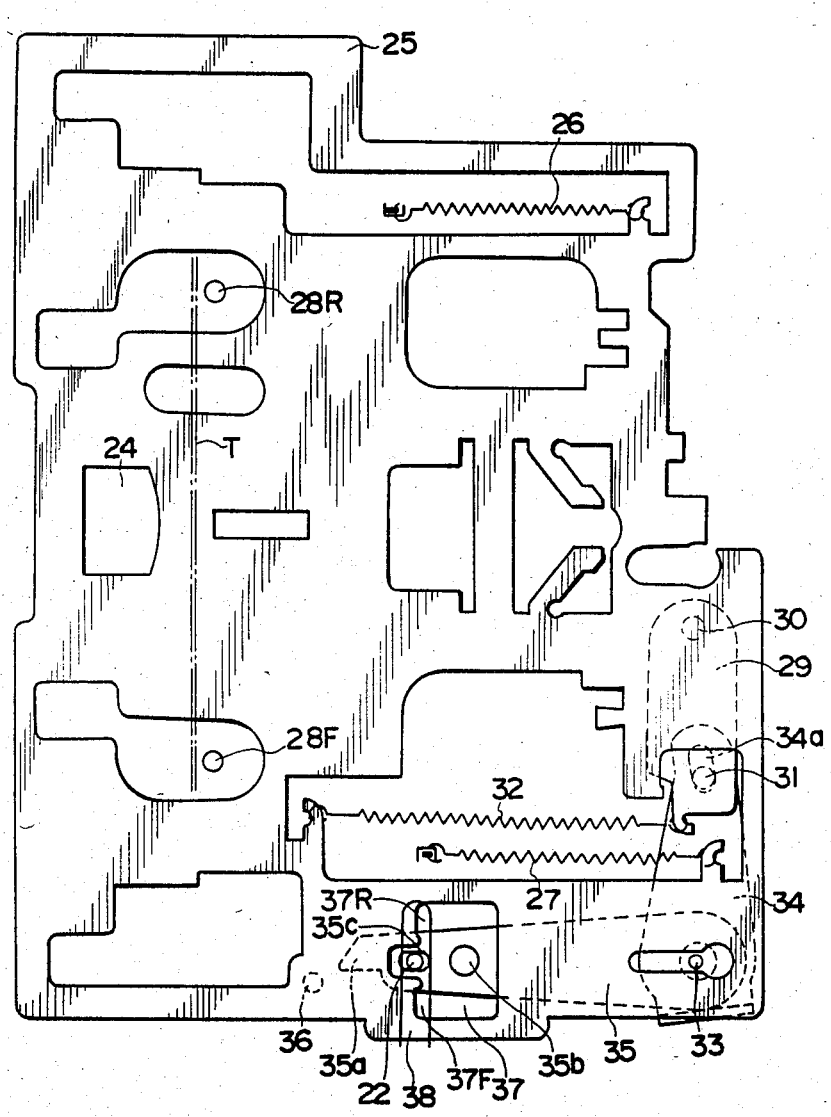

Stop Mode (FIGS. 1 and 6)

In the stop mode of the tape player, both the forward-drive and reverse-drive electromagnetic plungers 2F and 2R are deenergized, and both the lock arms 3F and 3R are kept at the clockwisely rotated positions. The cut-off 7F and 7R of the cam gears 6F and 6R face the drive gear 1 respectively. The lock member 5F and 5R of the lock arms 3F and 3R engage the locked members 9F and 9R of the cam gears 6F and 6R. Therefore, although the spring plates 11F and 11R contact the radially inner steps of the cams 10F and 10R and tend to push the cams for contacting the flat portion thereof, the cam gears 6F and 6R do not rotate. The mode plates 13F and 13R, slide plate 18 and lock plate 19 are all kept in their withdrawal positions accordingly, and the joint plate 20 connected to the mode plates 13F and 13R by the engagement pins 16F and 16R is at the withdrawal position, keeping its parallel aspect. The guide pin 20a located at its neutral position in the guide slot 23 of the fast-forwarding and rewinding plate 21 does not push the plate 21 to the forward-drive means nor to the reverse-drive means, and permits it to remain in the center of the movable stroke thereof.

As the slide plate 18 is in the withdrawal position, the head plate arm 34 united to the slide plate 18 by the connection pin 18c remains in the counterclockwisely rotated position. The upper arm of the head plate arm 34 does not apply any force to the head plate advancement pin 31 inserted in the hole 34a. So, the head plate 25 is kept at the withdrawal position by the energy of the springs 26 and 27.

Since the fast-forwarding and rewinding plate 21 is in the neutral position, the search link 35 united to the plate 21 by the fast-forwarding and rewinding pin 22 under the head plate 25 remains parallel with the head plate movement direction. Further, the withdrawal position of the head plate 25 does not allow the engagement pin 36 thereof to engage the step 35a of the search link 35.

At that time, the channel changing mechanism is disposed as follows:

The change-off plate 42 is in the withdrawal position and the change pin 42a thereof is in the wider half 41a of the change control hole 41 because the off plate 39 has not advanced yet. The change gear 43 does not rotate because the cut-off 43a faces the drive gear 45 and the gear lock member 42b of the change-off plate 42 engages the locked member 43b of the change gear 43 to lock it. The change link plate 44 driven by the change gear 43 remains at a position withdrawn to the forward-drive means or alternatively to a position fully advanced to the reverse-drive means.

Figure 2A:
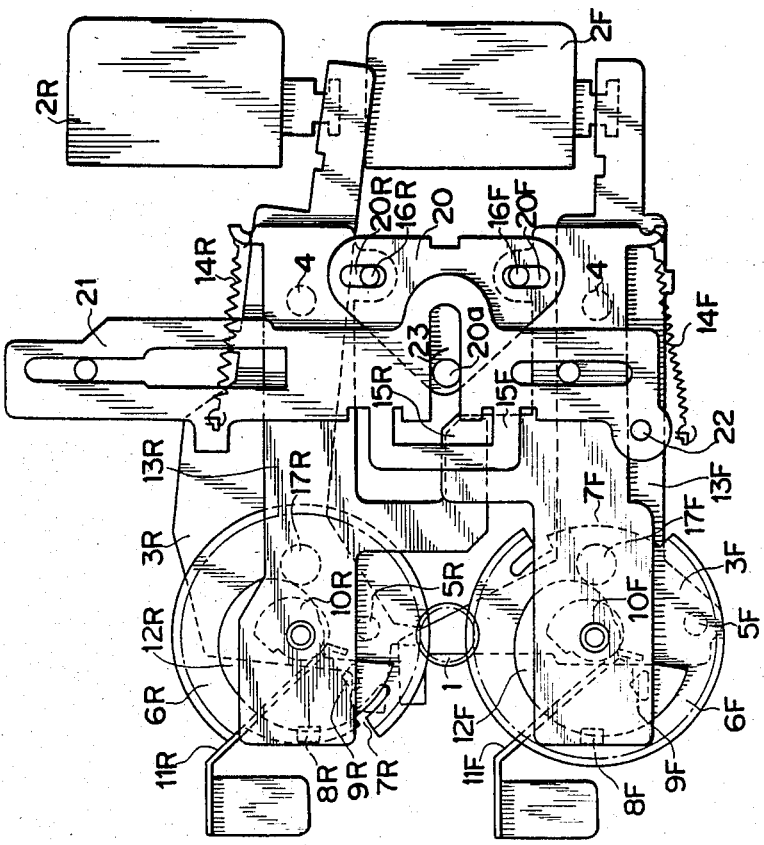

Beginning of Play Mode (FIG. 2)

When the electromagnetic plungers 2F and 2R are energized with the power source, the lock arms 3F and 3R are rotated in the counterclockwise direction so that the lock member 5F and 5R thereof come apart from the locked member 9F and 9R of the cam gears 6F and 6R. Then the cam gears 6F and 6R are no more disturbed to rotate, and are slightly rotated by the spring plates 11F and 11R which translocated from the radially inner steps to the flat portions of the cams 10F and 10R until the cam gears 6F and 6R engage the drive gear 1 and start rotating. Due to the slight rotations of the cam gears 6F and 6R, the cam followers 17F and 17R of the mode plates 13F and 13R contact the drive cams 12F and 12R on the cam gears 6F and 6R, and make the mode plates 13F and 13R advance in accordance with the ratations of the cam gears.

Immediately after the cam gears 6F and 6R start rotating, the reverse-drive electromagnetic plunger 2R is deenergized, and the lock arm 3R rotates in the clockwise direction up to the same position as in the stop mode, accordingly. However, since the cam gear 6R already started rotating, the mode plate 13R continues advancing together with the forward-drive mode plate 13F inspite of the deenergization of the plunger 2R. The slide plate 18 and the lock plate 19 interposed between the two mode plate 13F and 13R also advance because the urging members 15F and 15R of the mode plates push the pin 19a on the lock plate 19 along with advancement of the mode plates.

Concurrent advancements of the engagement pins 16F and 16R of the mode plates 13F and 13R make the joint plate 20 linked thereto move in parallel therewith. Along with this movement of the joint plate 20, the guide pin 20a thereon moves in parallel in the guide slot 23 of the fast-forwarding and rewinding plate 21 and never pushes it to the forward-drive means nor to the reverse-drive means. The plate 21 maintains its neutral position accordingly.

At that time, various members of the head plate 25 are disposed as follows:

The head plate arm 34 operatively linked to the connection pin 18c of the slide plate 18 starts rotating in the clockwise direction along with advancement of the slide plate 18. The upper arm of the head plate arm urges the head plate advancement pin 31 of the assistant arm 29 and makes the head plate 25 united together with the assistant arm 29 move forward. Since the spring 32 biasing the assistant arm 29 to the withdrawal position of the head plate 25 has an energy larger than those of the springs 26 and 27 biasing the head plate 25 itself, it never takes place that only the assistant arm 29 rotates when it is pulled in the advancement direction, and instead, it never fails to advance together with the head plate 25.

Since the fast-forwarding and rewinding plate 21 maintains the neutral position, the search link 35 also maintains the same position as in the stop mode. The head plate 25 does not yet finish the advancement and not yet reach a position whereat the engagement pin 36 engages the step 35a of the search link 35. On the other hand, the channel changing mechanism does not operate for the following reason. Due to energization of the reverse-drive plunger 2R, the off plate 39 also rotates with the lock arm 3R in the counterclockwise direction for unlocking the cam gear 6R. However, since the off plate 39 does not yet advance, the change pin 42a of the change-off plate 42 is in the wider half 41a of the change control hole 41, and is never pushed by any lateral edges of the hole 41 inspite of the rotation of the off plate 39. Therefore, the change-off plate 42 never moves and never effects the channel changing operation.

Immediately after this, the plunger 2R is deenergized and allows the off plate 39 to return to its original position. Therefore, in spite of a later advancement of the off plate 39 causing displacement of the change pin 42a from the wider half to the narrower half of the change control hole 41, the change pin 42a is never pushed by the lateral edges of the narrower half of the hole 41, and never effects the channel changing operation.

Figure 3A:
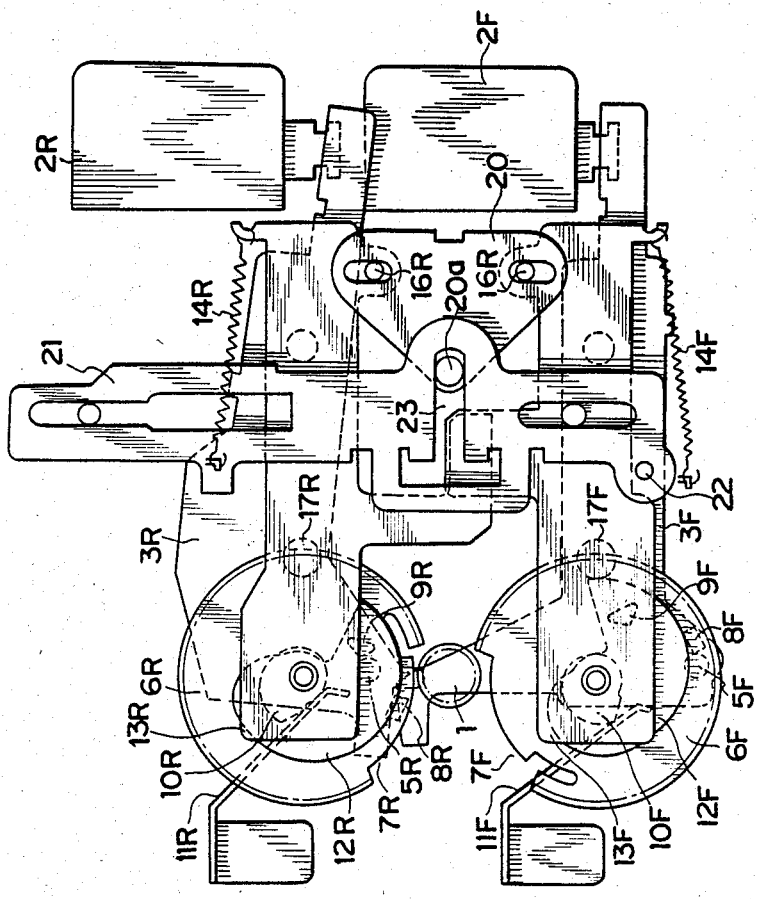
Figure 7:
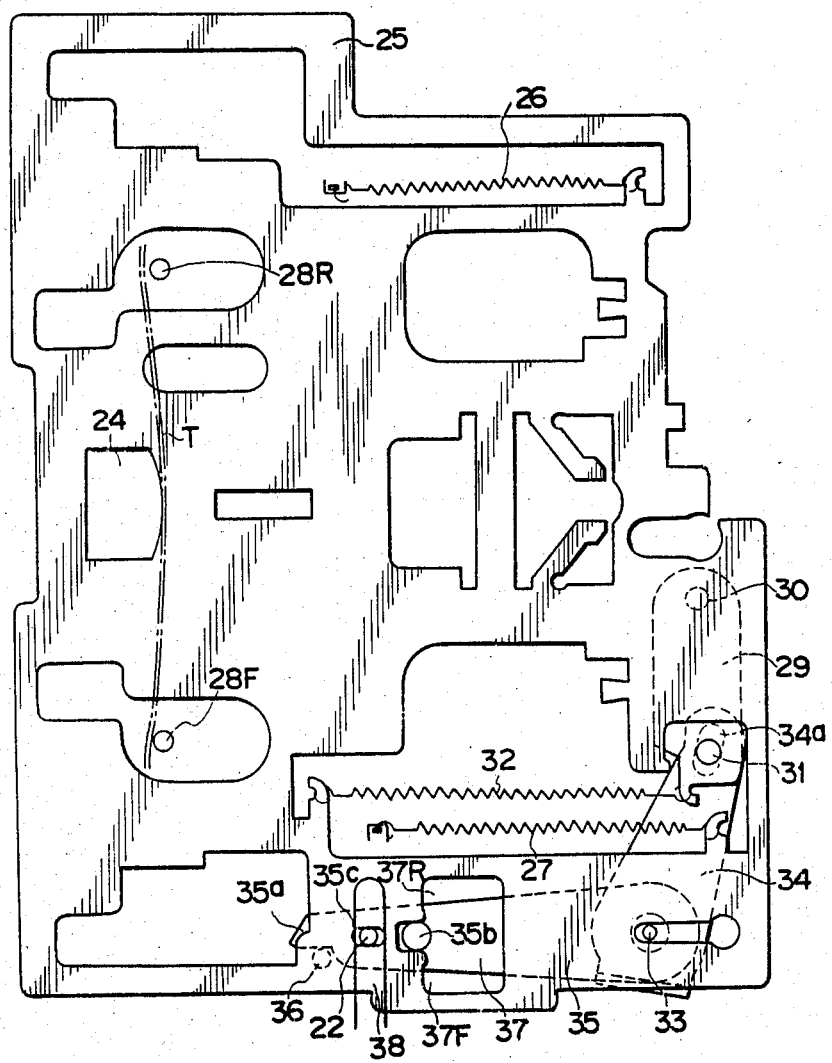

Play Mode (FIGS. 3 and 7)

The rotation of the forward-drive cam gear 6F stops at a position whereat the cut-off 7F faces the drive gear 1, and is locked there due to engagement of the engagement member 8F thereof with the lock member 5F of the lock arm 3F. The reverse-drive cam gear 6R is in the clockwisely rotated position due to deenergization of the plunger 2R whereat the lock member 5R does not engage the engagement member 8R of the cam gear 6R. Therefore, the cam gear 6R makes one revolution until the cut-off 7R faces the drive gear 1 and the locked member 9R engages the lock member 5R to lock the cam gear 6R. At that time, since the cam follower 17F of the forward-drive mode plate 13F has reached the largest radius position of the drive cam 12F, all the mode plate 13F, slide plate 18 and lock plate 19 have completed their advancements. Therefore, the head plate arm 34 linked to the slide plate 18 pulls the assistant arm 29 and fully moves the head 24 to the position for focible contact with a tape.

Since the reverse-drive cam gear 6R made one revolution, the cam follower 17R of the mode plate 13R which already completed its advancement is in the smallest radius position of the drive cam 12R whereat the mode plate 13R tends to retreat with the energy of the spring 14R. However, since the joint plate 20 is maintained parallel at the fully advanced position, the mode plate 13R is kept at the advanced position.

More specifically, upon completion of advancement of the head plate 25, the engagement pin 36 of the head plate 25 engages the step 35a of the search link 35 and prevents the search link 35 from rotating to the forward-drive means. Additionally, the control pin 35a of the search link 35 enters in the cavity portion of the control hole 37. Therefore, the search link 35 is kept at the neutral position and keeps the fast-forwarding and rewinding pin 22 of the plate 21 in the hole 35c of the search link 35 at the position to fix the plate 21 at the center of the movement stroke thereof. Thereby, nevertheless the guide pin 20a of the joint plate 20 positioned at an end of the guide slot 23 of the plate 21 tends to rotate in the counterclockwise direction, it is prevented by the guide slot 23. The joint plate 20 which is thus fixed unmovable by the engagement pin 16F and the guide pin 20a maintains its parallel aspect at the advanced position, and the mode plate 13R linked thereto by the engagement pin 16R also stops at the advanced position.

With this operational and positional relations between those various members, the play mode continues before the forward-drive plunger 2F is deenergized. Since the reverse-drive plunger 2R is kept deenergized throughout the time, the off plate 39 never urges the change pin 42a and never effects the channel changing operation in spite that the change pin 42a is in the narrower half 41a of the change control hole 41 of the off plate 39.

Beginning of Program Changing Operation (FIG. 4)

When a program changing switch is depressed in the play mode described above, the reverse-drive plunger 2R is energized. The off plate 39 still maintains the advanced position to place the change pin 42a of the change off plate 42 in the narrower half 41b of the change control hole 41. When the lock arm 3R rotates in the counterclockwise direction due to energization of the plunger 2R, the off plate 39 linked to the lock arm 3R also rotates so as to urge the change pin 42a to the forward-drive means by one of the lateral edges of the narrower half 41b of the change control hole 41.

Thereby, the change-off plate 42 is displaced to the forward-drive means so that the gear lock member 42b thereof comes apart from the engagement member 43b and unlocks the change gear 43. As the result, the change gear 43 is allowed to slightly rotate to engage the drive gear 45, and is thereafter driven thereby.

The slight initial rotation of the change gear 43 before engagement with the drive gear 45 is effected because the change link plate 44 is biased to the neutral position thereof by a spring force of the plate spring fixed to the change link plate 44 to actuate the head output signal change over switch, by a spring not shown to bias the idler gear to the neutral position, and by other members.

With the rotation of the change gear 43, the pin 43c fixed thereto urges the cahnge link plate 44 and moves it to the forward-drive means. Concurrently, a roller change plate not shown at the lower surface of the head plate 25 linked to the change link plate 44 starts moving to the reverse-drive means.

At the beginning of the program changing operation, the cam gear 6R is unlocked and starts rotating upon energization of the plunger 2R as at the beginning of the play mode. However, since the mode plate 13R has already completed the advancement, the cam gear 6R runs idle.

Figure 5:
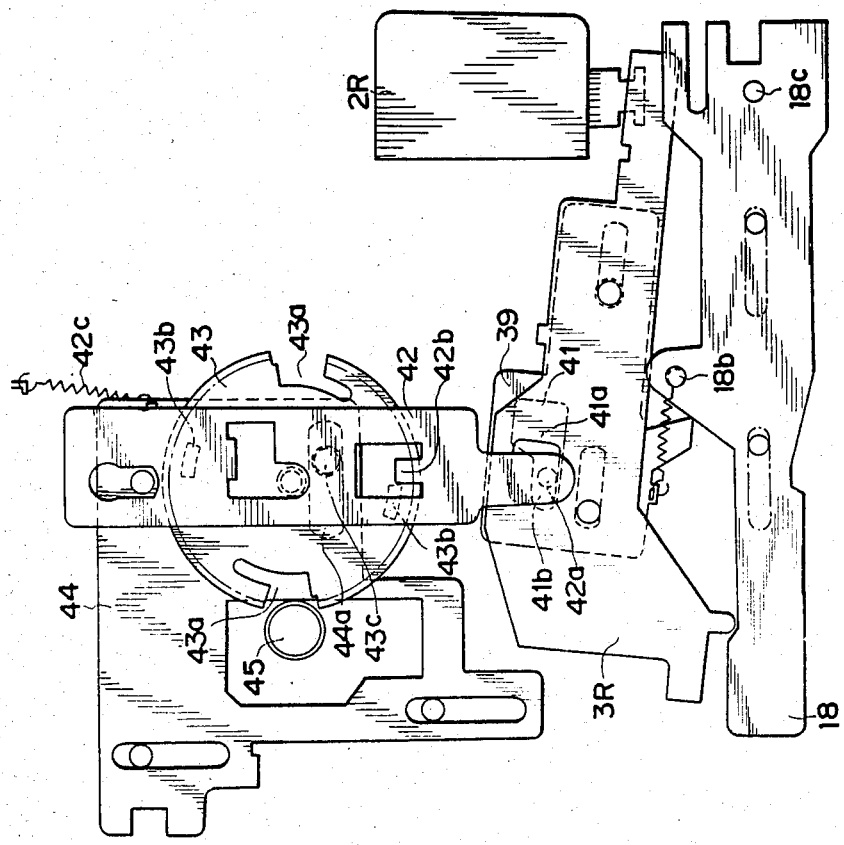

Completion of Channel Changing Operation (FIG. 5)

The electromagentic plunger 2R energized at the beginning of the channel changing operation is deenergized soon. The lock arm 3R and the off plate 39 are permitted to rotate in the clockwise direction to their original positions, accordingly. The change pin 42a in the narrower half 41b of the change control hole 41 is thereby released from the pressure by the lateral edge of the hole 41, and the change-off plate 42 is returned by the energy of the spring 42c to the position as it was in the stop mode.

The change gear 43 continues rotating and conveys the change link plate 44 forward. When one of the engagement members 43b of the change gear 43 other than that for the stop mode reaches a position to engage the gear lock member 42b of the change-off plate 42, the change gear 43 is locked thereby, and the cut-off 43a concurrently faces the drive gear 45.

When the cam gear 6R finished one revolution of idling, the cut-off 7R thereof faces the drive gear 1, and the lock member 5R of the lock arm 3R engages the locked member 9R, thereby locking the cam gear 6R unrotatable.

When the change link plate 44 completes its advancement to the forward-drive means, a roller change plate not shown which is located at one side opposed to the head plate 25 completes its advancement to the reverse-drive means. Thereby, the forward-drive pinch roller moves away from the capstan axle whereas the reverse-drive pinch roller forcibly contact the associated capstan axle. Concurrently, an idler change plate not shown displaces to its reverse-drive mode position so that the idler gear not shown engages the reverse-drive reel base not shown, thereby completing a program changing operation from the forward-drive mode to the reverse-drive mode.

The aforegoing description about the channel changing operation from the forward-drive mode to the reverse-drive mode will give a skilled in the art a sufficient understanding about a channel changing operation from the reverse-drive mode to the forward-drive mode.

From End of Play Mode to Stop Mode

When the play mode is finished, the electromagnetic plunger 2F is deenergized. The lock arm 3F rotates in the clockwise direction so as to bring the lock member 5F thereof away from the engagement member 8F of the cam gear 6F. The spring plate 11F located at the radially outer step of the cam 10F and tending to forcibly contact the flat portion of the cam 10F can now slightly move the cam gear 6F unlocked.

Accordingly, the cam follower 17F located at the largest radius position of the drive cam 12F moves away therefrom with the rotation of the cam gear 6F. The mode plate 13F carrying the cam follower 17F thereon and the joint plate 20 withdraw with the energy of the spring 14F and return to their stop mode positions. Concurrently, since the joint plate 20 is released from the fixture, the reverse-drive mode plate 13R also withdraws with the energy of the spring 14R. On the other hand, the cam 10F is urged by the spring plate 11F and continues rotating together with the cam gear 6F upto the position whereat the spring plate 11F contacts the radially inner step of the cam 10F. At this position of the cam 10F, the locked member 9F of the cam gear 6F engages the lock member 5F of the lock arm 3F, and the cam gear 6F stops the rotation.

Due to the withdrawals of the mode plates 13F and 13R, the pin 19a of the lock plate 19 is urged no longer by the urging members 15F and 15R of the mode plates 13F and 13R, and the lock plate 19 and the slide plate 18 operatively linked thereto are set free. As the result, the head plate 25 retreats with the energy of the springs 27 and 28, and the slide plate 18 and the lock plate 19 operatively linked to the head plate 25 via the head plate link 34 also return to their stop mode positions.

OTHER EMBODIMENTS

The invention is not limited to the embodiment illustrated, but instead, may be embodied in various forms as follows:

(1) While the embodiment illustrated uses the reverse-drive plunger 2R to actuate the channel changing mechanism, the forward-drive plunger 2F may be used. In the latter case, the off plate 39 will be fixed to the forward-drive lock arm 3F.

(2) The embodiment illustrated uses the off plate 39 and the slide plate 18 which are independently, separately formed. However, the slide plate 18 which is deformed to operate as the off plate 39 may be used, provided it can prevent the change-off plate 42 from displacement upon rotation of the lock arm during the time other than the advancement of the head.

(3) The embodiment illustrated effects a channel changing operation by cooperation of the pin 42a of the change-off plate 42 with the change control hole 41 of the off plate 39. Instead, a similar hole may be formed in the change-off plate 42 so as to cooperate with a similar pin formed on the off plate 39.

(4) In the embodiment illustrated, the change link plate 44 transmits rotation of the change gear 43 to the roller change plate and the idler change plate. However, the change link plate 44 may be deformed so as to directly operate the pinch roller and the idler gear.

(5) The embodiment illustrated uses the energy of the spring plates 11F and 11R and the cams 10F and 10R to bring the cam gears 6F and 6R in mesh with the drive gear 1. However, the slight initial rotation of the cam gears may be effected by use of the drive cams 12F and 12R and energy of springs biasing the mode plates 13F and 13R to their retracted positions.

(6) The embodiment illustrated employs the single mechanism to operate as both the fast-forwarding and rewinding mechanism and the head shift mechanism, and ensures maintenance of forcible contact of the head to a tape by keeping the forward-drive electromagnetic plunger 2F energized. However, the forward-drive plunger 2F may be also deenergized as same as the reverse-drive plunger 2R, immediately after the had starts advancing, provided a spring or another electromagnetic plunger is employed to maintain the forcible contact of the head. With this alternative construction, it is possible to select either the forward-drive plunger or the reverse-drive plunger to move the off plate 39 for the purpose of a channel changing operation.

(7) In the embodiment illustrated, the head shift mechanism is used to operate as both the fast-forwarding and rewinding mechanism and the head shift mechanism by making the forward-drive means and the reverse-drive means operate simultaneously. However, the both mechanisms may be independently provided. In this case, the head shift mechanism shall be operatively linked to the off plate 39 so that the off plate which has displaced in a play mode is moved by the forward-drive or reverse-drive electromagnetic plunger, thereby moving the change link plate 44.

ADVANTAGES OF THE INVENTION

The channel changing mechanism according to the invention can control the channel changing operation by use of conventionally used plungers and by simply adding the off plate movable in response to movement of the head to and away from a tape, and never needs another plunger exclusive for the channel changing operation. This contributes to a simpler construction, and a further reduction in size and cost of the tape player.

The embodiments of the invention in which an exclusive property or privilege is claimed are defined as follows:

1. A channel changing mechanism of a tape player which comprises:
forward-drive means for setting the tape player in its fast-forwarding drive mode;
reverse-drive means for setting the tape player in its rewinding drive mode;
forward-drive and reverse-drive electromagnetic plungers for actuating said forward-drive means and reverse-drive means, respectively;
an off plate responsive to a head shift mechanism of the tape player and to one of said electromagnetic plungers and taking different positions between the stop mode and the play mode of the tape player;
first drive gear continuously rotated by a drive motor of the tape player;
a change gear having a tooth train engageable with said first drive gear and a pair of cut-off partly breaking said tooth train and disengageable with said first drive gear;

a change link plate reciprocal responsively to rotation of said change gear for switching the tape player from a forward-drive mode to a reverse-drive mode or vice versa; and a change-off plate for locking said change gear at a position disengageable with said first drive gear, and responsive to said off plate when the off plate is in a position corresponding to the play mode of the tape player.

2. A channel changing mechanism as set forth in claim 1 wherein said change-off plate is fixed to said change gear.

3. A channel changing mechanism as set forth in claim 1 or 2 wherein said head shift mechanism is actuated by energy of said forward-drive and reverse-drive means when said both means operate simultaneously.

4. A channel changing mechanism as set forth in claim 1 or 2 wherein said forward-drive and reverse-drive means consist of, respectively: second drive gear continuously driven by said drive motor, forward-drive and reverse-drive cam gears each including a tooth train engageable with said second gear and a cut-off disengageable with said second gear, forward-drive and reverse-drive mode plates each movable responsively to rotation of said cam gear, and forward-drive and reverse-drive lock arms each responsive to said mode plate and said electromagnetic plunger to lock said cam gear at a position disengageable with said second drive gear.

5. A channel changing mechanism as set forth in claim 4 wherein said change-off plate is disposed slidable so that a position thereof in the stop mode of the tape player with respect to said forward-drive or reverse-drive lock arm differs from that in the play mode of the tape player.

6. A channel changing mechanism as set forth in claim 1 or 2 wherein said off plate includes an elongated hole, and said change-off plate has a change pin inserted in said elongated hole.

7. A channel changing mechanism as set forth in claim 6 wherein said elongated hole includes a wider half and a narrower half so that said change pin is positioned in said wider half in the stop mode of the tape player and in said narrower half in the play mode of the tape player.

* * * * *